(12) United States Patent
Gao et al.

(10) Patent No.: US 12,358,509 B2
(45) Date of Patent: Jul. 15, 2025

(54) VEHICLE CONTROL BASED ON A DYNAMICALLY CONFIGURED SIDESLIP LIMIT

(71) Applicant: VOLVO TRUCK CORPORATION, Gothenburg (SE)

(72) Inventors: Yangyan Gao, Gothenburg (SE); Leon Henderson, Härryda (SE); Timothy Gordon, Lincoln (GB)

(73) Assignee: VOLVO TRUCK CORPORATION, Gothenburg (CH)

( * ) Notice: Subject to any disclaimer, the term of this patent is extended or adjusted under 35 U.S.C. 154(b) by 260 days.

(21) Appl. No.: 17/817,560

(22) Filed: Aug. 4, 2022

(65) Prior Publication Data

US 2023/0063613 A1 Mar. 2, 2023

(30) Foreign Application Priority Data

Aug. 31, 2021 (EP) ..................................... 21194181

(51) Int. Cl.
*B60W 30/18* (2012.01)
*B60W 50/14* (2020.01)
*B60W 60/00* (2020.01)

(52) U.S. Cl.
CPC ...... *B60W 30/18172* (2013.01); *B60W 50/14* (2013.01); *B60W 60/001* (2020.02);
(Continued)

(58) Field of Classification Search
CPC ......... B60W 30/18172; B60W 60/001; B60W 50/14; B60W 2300/10; B60W 2300/145;
(Continued)

(56) References Cited

U.S. PATENT DOCUMENTS 5,297,859 A * 3/1994 Suzuki ................. B60T 8/1706
303/137
5,473,225 A * 12/1995 Miyazaki ................. B60L 3/10
318/52
(Continued)

FOREIGN PATENT DOCUMENTS

| CN | 106740273 A | 5/2017 |
| WO | 2019072379 A1 | 4/2019 |
| WO | 2021144065 A1 | 7/2021 |

OTHER PUBLICATIONS

Basilio Lenzo et al., Yaw Rate and Slideslip Angle Control Through Single Input Single Output Direct Yaw Moment Control, Jan. 2021, IEEE, vol. 29, No. 1, pp. 1-16 (pdf).*
(Continued)

*Primary Examiner* — Manglesh M Patel
(74) *Attorney, Agent, or Firm* — Venable LLP; Jeffri A. Kaminski

(57) ABSTRACT

A computer-implemented method performed in a vehicle control unit for controlling motion of a heavy-duty vehicle. The method includes obtaining a vehicle motion request, wherein the vehicle motion request is indicative of a target curvature and a target acceleration, determining a motion support device, MSD, control allocation based on the vehicle motion request, determining a dynamic wheel slip angle limit based on the vehicle motion request, where dynamic wheel slip angle limit increases with a decreasing target acceleration, and controlling the motion of the heavy-duty vehicle based on the MSD control allocation constrained by the dynamic wheel slip angle limit.

21 Claims, 8 Drawing Sheets

(52) U.S. Cl.
CPC ... *B60W 2300/10* (2013.01); *B60W 2300/145* (2013.01); *B60W 2520/06* (2013.01); *B60W 2520/105* (2013.01); *B60W 2520/14* (2013.01); *B60W 2520/20* (2013.01); *B60W 2520/26* (2013.01); *B60W 2520/28* (2013.01); *B60W 2520/30* (2013.01); *B60W 2530/20* (2013.01); *B60W 2540/18* (2013.01)

(58) Field of Classification Search
CPC ....... B60W 2520/06; B60W 2520/105; B60W 2520/14; B60W 2520/20; B60W 2520/26; B60W 2520/28; B60W 2520/30; B60W 2530/20; B60W 2540/18; B60W 30/12; B60W 30/16; B60W 30/162; B60W 30/165; B60W 30/17; B60K 28/00; B60K 28/165; G05D 1/0088; G05D 1/021; G05D 1/0214; G05D 1/0221; G05D 1/0223; G05D 1/0061
USPC .......................... 701/23, 74, 82–84, 88–92
See application file for complete search history.

(56) References Cited

U.S. PATENT DOCUMENTS

| | | | | |
|---|---|---|---|---|
| 6,062,336 | A * | 5/2000 | Amberkar | B62D 6/00 180/443 |
| 6,152,546 | A * | 11/2000 | Daigle | B60T 8/1705 303/151 |
| 6,285,944 | B1 * | 9/2001 | Tange | B60K 31/0008 180/197 |
| 6,285,949 | B1 * | 9/2001 | Roediger | G08G 1/0104 701/119 |
| 6,648,426 | B1 * | 11/2003 | Boettiger | B60T 8/1755 303/146 |
| 6,671,595 | B2 * | 12/2003 | Lu | B60T 8/17551 180/197 |
| 6,856,886 | B1 * | 2/2005 | Chen | B60W 10/184 477/107 |
| 7,274,984 | B2 * | 9/2007 | Shin | B62D 7/159 701/84 |
| 7,580,785 | B2 * | 8/2009 | Matsumoto | B60W 30/12 701/41 |
| 7,706,945 | B2 * | 4/2010 | Deng | B60T 8/1755 701/25 |
| 7,774,103 | B2 * | 8/2010 | Deng | B60T 8/172 701/1 |
| 7,835,846 | B2 * | 11/2010 | Chen | B60W 30/02 701/41 |
| 7,997,373 | B2 * | 8/2011 | Yasui | B62D 6/003 701/41 |
| 8,639,402 | B2 * | 1/2014 | Tate | B60L 50/61 701/84 |
| 8,897,937 | B2 * | 11/2014 | Kawada | B61C 17/12 701/19 |
| 9,296,424 | B2 * | 3/2016 | Cotgrove | B62D 15/025 |
| 10,118,616 | B2 * | 11/2018 | Nemoto | G08G 1/22 |
| 2002/0183913 | A1 * | 12/2002 | Ehret | B62D 6/00 701/72 |
| 2003/0125864 | A1 * | 7/2003 | Banno | B60W 10/184 701/84 |
| 2003/0130775 | A1 * | 7/2003 | Lu | B60T 8/17551 701/1 |
| 2004/0199321 | A1 * | 10/2004 | Lin | B60T 8/17551 180/197 |
| 2006/0136112 | A1 * | 6/2006 | Lin | B62D 5/008 701/41 |
| 2006/0170281 | A1 * | 8/2006 | Hattori | B60T 8/1725 303/20 |
| 2007/0145819 | A1 * | 6/2007 | Lin | B60T 8/17552 303/146 |
| 2007/0205879 | A1 * | 9/2007 | Matsuda | B60T 8/17616 73/146 |
| 2007/0213912 | A1 * | 9/2007 | Deur | B60T 8/175 180/197 |
| 2008/0082246 | A1 | 4/2008 | Brown et al. | |
| 2010/0077847 | A1 * | 4/2010 | Joe | G01M 17/02 73/146 |
| 2010/0114431 | A1 * | 5/2010 | Switkes | B62D 6/006 701/41 |
| 2010/0131466 | A1 * | 5/2010 | Chen | G06F 11/2074 707/613 |
| 2010/0250083 | A1 * | 9/2010 | Takahashi | B60W 10/18 701/70 |
| 2011/0202238 | A1 * | 8/2011 | Cebon | B62D 13/04 701/41 |
| 2012/0221168 | A1 * | 8/2012 | Zeng | B60W 60/0018 701/1 |
| 2013/0030601 | A1 * | 1/2013 | Yoon | B60W 10/08 701/1 |
| 2013/0144476 | A1 * | 6/2013 | Pinto | B60T 8/17555 903/930 |
| 2014/0005875 | A1 * | 1/2014 | Hartmann | G08G 1/165 701/1 |
| 2014/0067219 | A1 * | 3/2014 | Stares | B60K 23/08 701/69 |
| 2014/0303850 | A1 * | 10/2014 | Chai | G01M 17/06 701/42 |
| 2015/0175009 | A1 * | 6/2015 | Beever | B60K 7/0007 701/22 |
| 2015/0329093 | A1 * | 11/2015 | Svensson | B60T 8/1766 701/74 |
| 2016/0327451 | A1 * | 11/2016 | Bauer | G01M 13/025 |
| 2017/0217410 | A1 * | 8/2017 | Kerber | B60T 8/17636 |
| 2017/0232848 | A1 * | 8/2017 | Lian | B60W 30/18172 701/22 |
| 2018/0118220 | A1 | 5/2018 | Kimura | |
| 2018/0339699 | A1 * | 11/2018 | Matsuda | B60W 10/184 |
| 2019/0176784 | A1 * | 6/2019 | Laine | B60T 8/172 |
| 2019/0176801 | A1 | 6/2019 | Ruybal et al. | |
| 2019/0256103 | A1 * | 8/2019 | Capua | B60W 40/101 |
| 2020/0070802 | A1 | 3/2020 | Yamada | |
| 2020/0140009 | A1 * | 5/2020 | Sasaki | B62D 6/04 |
| 2021/0155290 | A1 * | 5/2021 | Chen | B62D 7/166 |
| 2022/0011783 | A1 * | 1/2022 | Groden | G05D 1/101 |
| 2022/0126799 | A1 * | 4/2022 | Arikere | B60T 8/172 |
| 2022/0306117 | A1 * | 9/2022 | Laine | B60T 8/1725 |
| 2022/0379895 | A1 * | 12/2022 | Goh | B60W 30/09 |
| 2022/0397188 | A1 * | 12/2022 | Hirazumi | F16H 48/20 |
| 2023/0017226 | A1 * | 1/2023 | Ushiki | B60K 17/35 |
| 2023/0126666 | A1 * | 4/2023 | O'Dea | B62D 5/0457 701/41 |
| 2023/0339456 | A1 * | 10/2023 | Luo | B60W 40/103 |

OTHER PUBLICATIONS

Qian Lu et al., Enhancing vehicle cornering limit through slideslip and yaw rate control, Dec. 2015, elsevier.com, pp. 1-18 (pdf).*
Taeyoung Chung et al., Side Slip Angle Based Control Threshold of Vehicle Stability Control System, 2005, Journal of Mechanical Science and Technology, vol. 19, No. 4, pp. 985-992.*
Extended European Search Report in corresponding European Application No. 21194181.0 dated Jan. 25, 2022 (8 pages).
European Communication pursuant to Article 94(3) EPC dated Jan. 10, 2024 in corresponding European Patent Application No. 21194181.0, 5 pages.

* cited by examiner

VEHICLE CONTROL BASED ON A DYNAMICALLY CONFIGURED SIDESLIP LIMIT

TECHNICAL FIELD

The present disclosure relates to vehicle motion management for heavy-duty vehicles, i.e., coordinated control of motion support devices such as service brakes, propulsion devices and power steering. The invention can be applied in heavy-duty vehicles such as trucks, buses, and in construction machines such as excavators and haulers. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSDs). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion and power management (VMPM) functionality executed, e.g., on a central vehicle control unit (VCU) or distributed over a network of electronic control units (ECU) relies on combinations of the MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy-duty vehicle. The VMPM control may advantageously be based on wheel speed requests or wheel slip requests transmitted from the VMPM to MSD control units which control the various MSDs by low delay—high bandwidth control loops targeted at maintaining wheel behavior as close as possible to the requested wheel slip or wheel speed values. VMPM control may also comprise more traditional torque-based requests that are transmitted from the VMPM to the MSD control units.

WO 2021144065 A1 also discloses a vehicle motion management system arranged to limit wheel slip.

At least partly due to the complexity inherent in these advanced motion management functions, additional safety mechanisms are often desired. For instance, there is a need for methods and control architectures which can prevent these advanced motion management functions from inadvertently introducing excessive wheel slip.

SUMMARY

It is an object of the present disclosure to provide control units and methods which facilitate vehicle control in a safe, efficient, and robust manner.

This object is at least in part obtained by a computer-implemented method performed in a vehicle control unit for controlling motion of a heavy-duty vehicle. The method comprises obtaining a vehicle motion request, wherein the vehicle motion request is indicative of a target curvature and a target acceleration. The method also comprises determining a motion support device (MSD) control allocation based on the vehicle motion request and determining a dynamic wheel slip angle limit for at least one wheel of the vehicle based on the vehicle motion request, where the dynamic wheel slip angle limit increases with a decreasing target acceleration, and also controlling the motion of the heavy-duty vehicle based on the MSD control allocation constrained by the dynamic wheel slip angle limit.

This way the MSD control allocation can be determined freely to meet a vehicle motion request from a higher layer in the vehicle control stack as long as the resulting wheel behavior is within the dynamically configured wheel slip limit, which greatly simplifies the required computations involved in the MSD allocation. For instance, the MSD control allocation can be determined under assumptions of linear relationships between wheel slip and wheel force, which simplifies computations since non-linear effects need not be accounted for in the allocation. As soon as wheel behavior deviates beyond the imposed slip limit, a control intervention function represented by the dynamic longitudinal wheel slip limit is triggered and assumes wheel control to, e.g., maintain a linear wheel force vs wheel slip relationship. It is an advantage that the dynamic longitudinal wheel slip limit increases with a decrease in the target curvature, since this way the overall control freedom is increased compared to the case where, e.g., a fixed dynamic slip limit is configured with a large margin to account for curvature, or a dynamic slip limit which is configured in dependence of a road friction condition, but which does not account for the desired vehicle motion. Consequently, the safety margin implied by the wheel slip limits can be decreased by the herein disclosed techniques, which is an advantage. For instance, hard braking on a straight road can now be performed with a higher slip limit, meaning more longitudinal force becomes available, since the curvature request will be small in this case.

The herein disclosed methods are applicable for dynamic configuration of both lateral and longitudinal wheel slip limits. Interestingly, as will be shown below, the two can be traded against each other. The methods disclosed herein can be used to balance a requirement on longitudinal wheel slip against a requirement on lateral wheel slip.

According to aspects, the vehicle motion request is obtained from a driver input and/or from an autonomous or semi-autonomous traffic situation management (TSM) function. Thus, the methods are applicable with advantage for both autonomous, semi-autonomous, and manual driving applications.

According to aspects, the method comprises determining the MSD control allocation based on a B-matrix control allocation method. B-matrix control allocation methods are well known and commonly applied in the control of heavy-duty vehicles. It is an advantage that the herein disclosed techniques are combinable with these types of control methods.

According to aspects, the method comprises determining the MSD control allocation at least partly as a target wheel torque, and/or as a target longitudinal wheel slip or wheel speed relative to ground. Thus, it is appreciated that the herein disclosed techniques are general in application and can be adapted for a wide range of different applications. The methods may also comprise determining the MSD control allocation at least partly as a target steering angle.

According to aspects, the method comprises predicting a longitudinal wheel slip resulting from the vehicle motion request and determining the dynamic wheel slip angle limit based on the predicted longitudinal wheel slip. Thus, advantageously, wheel slip angle limit is determined in accordance with an expected longitudinal wheel slip, meaning that overall vehicle slip remains within desired bounds. The method may also comprise predicting a required longitudinal force to be generated based on the vehicle motion request and determining the dynamic wheel slip angle limit based on the predicted required longitudinal force. Similar to the longitudinal wheel slip, required longitudinal force may be accounted for in determining the dynamic wheel slip angle limit.

The method may furthermore comprise determining a dynamic steering angle limit based on the dynamic wheel slip angle limit and on a vehicle state and also determining a dynamic steering angle rate limit based on the dynamic wheel slip angle limit and on a vehicle state.

According to a preferred implementation, the method comprises determining the dynamic wheel slip angle limit by executing a modified Hamiltonian algorithm (MHA). The details of this Hamiltonian algorithm will be discussed in more detail below. The MHA may for instance comprise minimizing local Hamiltonian functions at one or more wheels, where each minimization comprises a linear search of a tyre force curve.

The method may furthermore comprise determining the dynamic wheel slip angle limit as a function of lateral wheel force capability and longitudinal wheel force capability. Thus, the slip limits are set in dependence of capability, ensuring that capability is not exceeded, which of course would be undesired. The function of lateral wheel force capability and longitudinal wheel force capability can, for instance, be based on a pre-determined limit on predicted reduction in generated longitudinal force corresponding to an increase in generated lateral force.

The method may furthermore comprise determining a dynamic longitudinal wheel slip limit based on a stability condition involving a maximum acceptable yaw moment of the vehicle. Thus, advantageously, the herein presented methods can be used to ensure that the vehicle does not experience excessive yaw moments, which is an advantage.

The methods may also comprise triggering a torque overlay on a vehicle steering wheel in case a current steering wheel angle generates a sideslip angle in excess of the dynamic wheel slip angle limit. Thus, a driver immediately becomes aware of undesired steering operations, which is an advantage. Also, a warning signal can be triggered to notify a driver of the vehicle in case a current steering wheel angle generates a sideslip angle in excess of the dynamic wheel slip angle limit.

There is also disclosed herein computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
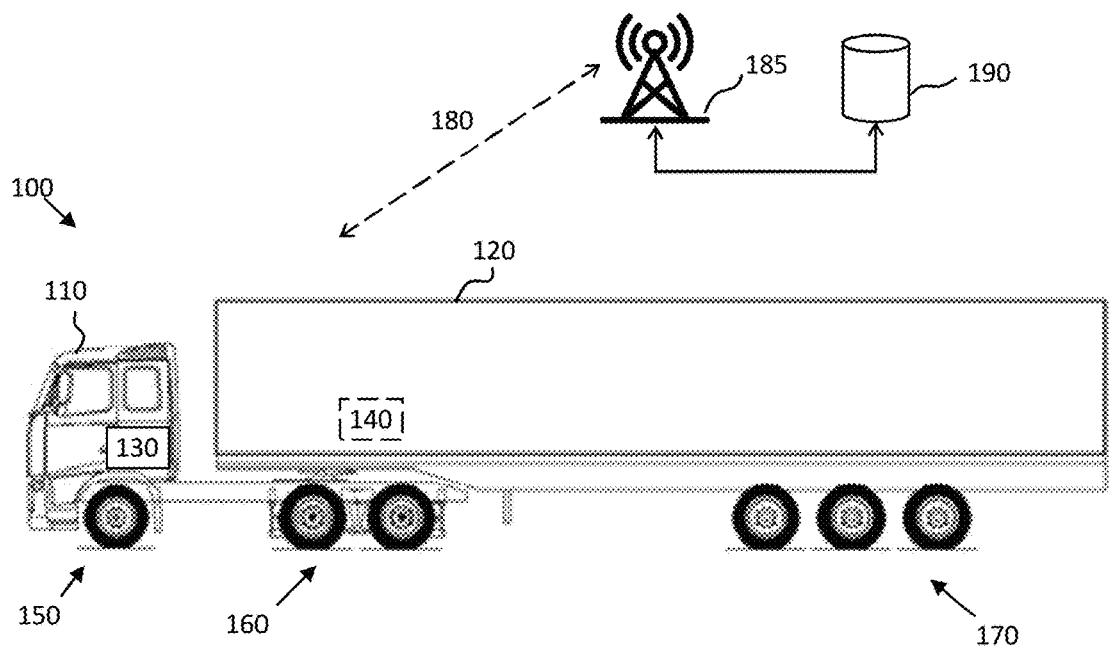
FIG. 1 shows an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels and at least some of which are steered wheels. Normally but not necessarily, all the wheels on the tractor are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles. Some trailers also comprise steered wheels in order to improve maneuverability.

It is appreciated that the herein disclosed methods and control units can be applied with advantage also in other types of heavy-duty vehicles, such as trucks with drawbar connections, construction equipment, buses, and the like. The vehicle 100 may also comprise more than two vehicle units, i.e., a dolly vehicle unit may be used to tow more than one trailer.

The tractor 110 comprises a vehicle control unit (VCU) 130 for controlling various kinds of functionality, i.a. to achieve propulsion, braking, and steering. Some trailer units 120 also comprise a VCU 140 for controlling various functions of the trailer, such as braking of trailer wheels, and sometimes also trailer wheel propulsion and steering. The VCUs 130, 140 may be centralized or distributed over several processing circuits, often referred to as electronic control units (ECU). Parts of the vehicle control functions may also be executed remotely, e.g., on a remote server 190 connected to the vehicle 100 via wireless link 180 and a wireless access network 185.

The VCU 130 on the tractor 110 (and possibly also the VCU 140 on the trailer 120) may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer. A VMM function which also handles vehicle power management will be referred to herein as a vehicle motion and power management function (VMPM). It is appreciated that the VMM function may be operated as a stand-alone function or as part of a VMPM function, without loss in generality.

Figure 2:
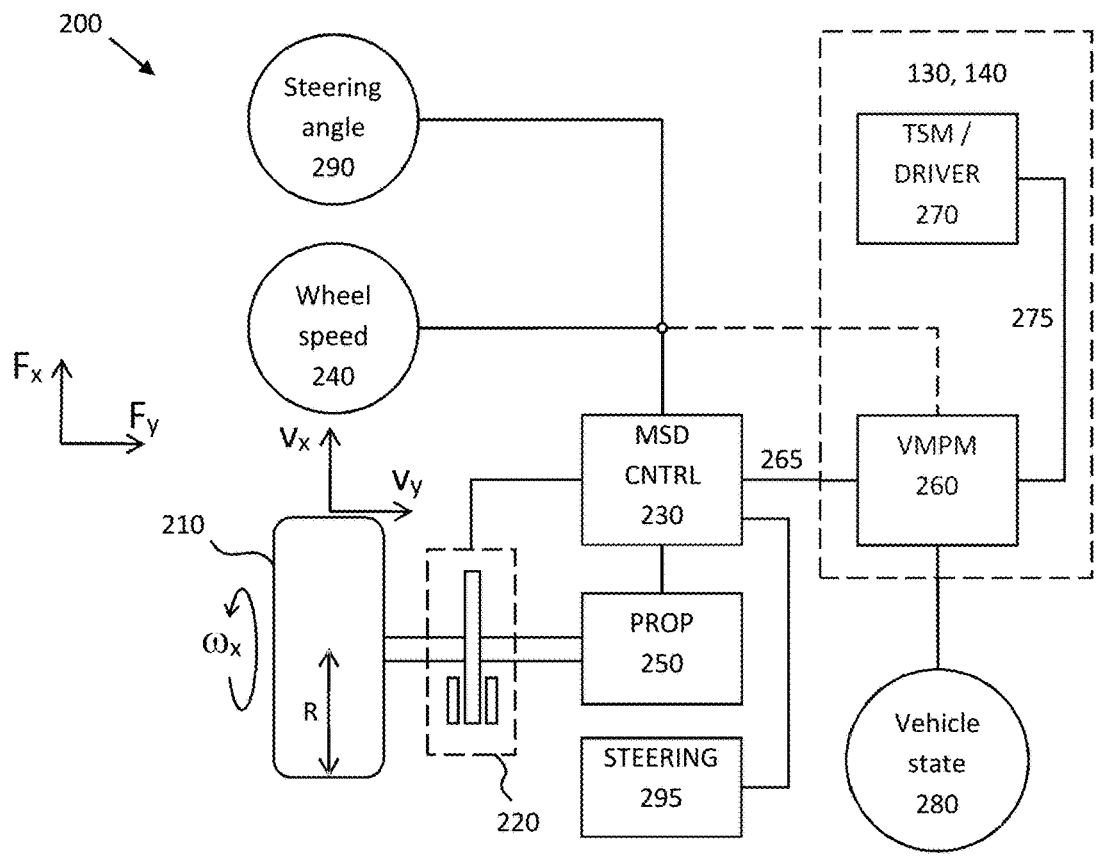
FIG. 2 schematically illustrates a motion support device arrangement.

FIG. 2 schematically illustrates functionality 200 for controlling a wheel 210 on the vehicle 100 by some example MSDs here comprising a friction brake 220 (such as a disc brake or a drum brake), a propulsion device 250 and a steering arrangement 295. The friction brake 220 and the propulsion device are examples of wheel torque generating devices, which can be controlled by one or more motion support device control units 230. The control is based on, e.g., measurement data obtained from a wheel speed sensor 240 and from other vehicle state sensors 280, such as radar sensors, lidar sensors, and also vision based sensors such as camera sensors and infra-red detectors. An MSD control unit 230 may be arranged to control one or more actuators. For instance, it is not uncommon that an MSD control unit 230 is arranged to control both wheels on an axle.

The functionality 200 comprises control of steering angle via the power steering arrangement 295. The MSD control unit 230 receives information related to the current steering angle, either directly from a steering angle sensor 290 or indirectly via a model of steering angle as function of steering angle control input generated by the MSD control unit 230. The control of steering by the MSD control unit 230 may be a direct control of steered angle δ, or via a steering angle limit imposed on some other steering angle control unit or arrangement.

The TSM function 270 plans driving operation with a time horizon of 10 seconds or so. This time frame corresponds to, e.g., the time it takes for the vehicle 100 to negotiate a curve or the like. The vehicle maneuvers, planned and executed by the TSM, can be associated with acceleration profiles and curvature profiles which describe a desired target vehicle velocity in the vehicle forward direction and turning to be maintained for a given maneuver. The TSM continuously requests the desired acceleration profiles $a_{req}$ and curvature profiles $c_{req}$ from the VMPM function 260 which performs force allocation to meet the requests from the TSM in a safe and robust manner. The VMPM function 260 continuously feeds back capability information to the TSM function detailing the current capability of the vehicle in terms of, e.g., forces, maximum velocities, and accelerations which can be generated. The VMPM function operates on a timescale of below one second or so and will be discussed in more detail below.

Acceleration profiles $a_{req}$ and curvature profiles $c_{req}$ may also be obtained from a driver of the heavy-duty vehicle via normal control input devices such as a steering wheel, accelerator pedal and brake pedal. The desired curvature is then a function of the steering wheel input, while the desired acceleration is a function of the acceleration and brake pedal inputs. The source of said acceleration profiles and curvature profiles is not within scope of the present disclosure and will therefore not be discussed in more detail herein.

The wheel 210 has a longitudinal velocity component $v_x$ and a lateral velocity component $v_y$. There is a longitudinal wheel force $F_x$ and a lateral wheel force $F_y$. Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $\omega_x$, and a radius R.

Longitudinal wheel slip $\lambda_x$, may, in accordance with SAE J670 (SAE Vehicle Dynamics Standards Committee Jan. 24, 2008) be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The VMPM 260 and optionally also the MSD control unit 230 maintains information on $v_x$ (in the reference frame of the wheel), while a wheel speed sensor 240 or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre 210 is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$ by the wheel since, normally, $F_x \leq \mu F_z$, where μ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

Figure 3:
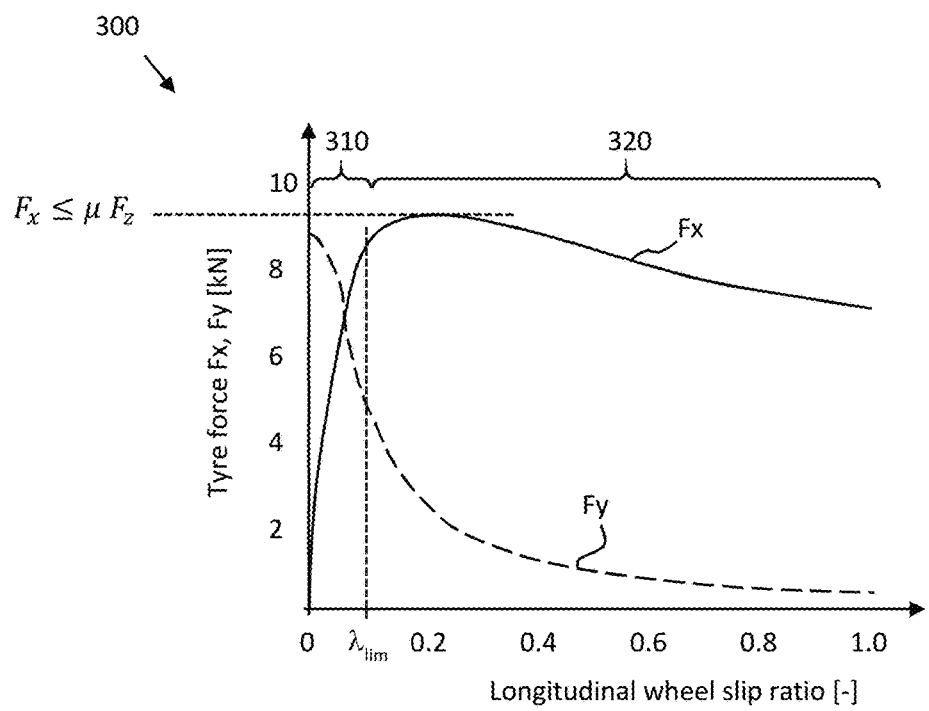
FIG. 3 is a graph showing tyre forces as function of longitudinal wheel slip.

FIG. 3 is a graph showing an example 300 of achievable tyre force as function of longitudinal wheel slip. The longitudinal tyre force Fx shows an almost linearly increasing part 310 for small wheel slips, followed by a part 320 with more non-linear behaviour for larger wheel slips. The obtainable lateral tyre force Fy decreases rapidly even at relatively small longitudinal wheel slips. It is desirable to maintain vehicle operation in the linear region 310, where the obtainable longitudinal force in response to an applied brake command is easier to predict, and where enough lateral tyre force can be generated if needed. To ensure operation in this region, a wheel slip limit $\lambda_{lim}$ on the order of, e.g., 0.1, can be imposed on a given wheel. For larger wheel slips, e.g., exceeding 0.1, a more non-linear region 320 is seen. Control of a vehicle in this region may be difficult and is therefore often avoided. It may be interesting for traction in off-road conditions and the like where a larger slip limit for traction control might be preferred, but not for on-road operation.

A safety margin is often used with the slip limit in order to guarantee that the vehicle does not end up in the non-linear region 320, and can generate sufficient lateral force to, e.g., perform a cornering manoeuvre. This safety margin of course reduces the slip limit, which in turn means that the force generation capability of the vehicle decreases. It is desired to keep this safety margin as small as possible.

Herein, wheel slip angle or sideslip angle α indicates the angle between the direction in which a wheel is pointing and the direction in which it is actually traveling. This slip angle results in a force, the cornering force, which is in the plane of the contact patch and perpendicular to the intersection of the contact patch and the midplane of the wheel. The cornering force increases approximately linearly for the first few degrees of slip angle, then increases non-linearly to a maximum before beginning to decrease.

The slip angle, α is defined as $$\alpha = \arctan\left(\frac{v_y}{|v_x|}\right)$$

Some of the techniques described herein rely on the realization that, for most vehicle manoeuvres and for most vehicle states, there is a slip angle α beyond which vehicle maneuvering capability deteriorates, i.e., additional slip angle increase will only lead to worse vehicle maneuverability "more is worse". When the current sideslip angle of some wheel on the vehicle 100 approaches the limit value, it no longer makes sense to increase steering angle further, since the sideslip then becomes too large. As will be discussed below, a too large sideslip angle often results in loss of capability to generate longitudinal force. Also, at small longitudinal wheel slips, a too large sideslip angle may even imply a reduction in generated lateral force by a tyre. The techniques disclosed herein are based on the realization that where current slip conditions in one direction impose slip limits in the other direction. So, if the vehicle needs to generate a large longitudinal force, then a correspondingly large longitudinal wheel slip is required, which may well require imposing limits the allowable sideslip angles that the vehicle can have during the maneuver. On the other hand, if the requirements on supporting longitudinal wheel slip are small, then a larger sideslip angle may be allowed.

A key concept of the present disclosure is to set limits for steered angle, or equivalently, steered angle rate, based on the current state of the vehicle and based on the desired motion by the vehicle, i.e., based on the motion request from the higher layer control functions.

Some other techniques described herein rely on the realization that, for some manoeuvres, it is absolutely imperative that large lateral forces can be generated, such as during cornering. However, if the TSM function requests hard braking on a straight road without any associated curvature request, then no significant amounts of lateral forces will be required. This means that it can be advantageous to also configure a longitudinal wheel slip limit in a dynamic fashion, such that the current slip limit $\lambda_{lim}$ is determined in dependence of the requests from the TSM layer. This way the longitudinal slip limit can be configured to increase with a decreasing target curvature and decrease with an increasing target curvature, thus allowing more longitudinal wheel force to be generated during maneuvers which do not require a lot of lateral wheel force. This means that a vehicle entering into a turning maneuver will have a lower slip limit configured in order to generate the required lateral forces compared to a vehicle driving on a straight road where no large lateral forces are required.

The type of tyre model 300 shown in FIG. 3 can be used by the VMPM 260 to generate a desired tyre force at some wheel. Instead of requesting a torque corresponding to the desired tyre force, the VMPM can translate the desired tyre force into an equivalent wheel slip (or, equivalently, a wheel speed relative to a speed over ground) and request this slip instead. The main advantage being that the MSD control device 230 will be able to deliver the requested torque with much higher bandwidth by maintaining operation at the desired wheel slip, using the vehicle speed $v_x$, and the wheel rotational velocity $\omega_x$, obtained, e.g., from the wheel speed sensor 240. The vehicle speed $v_x$ can be obtained from various vehicle sensors such as radar, lidar, and vision-based sensor in combination with a global positioning system (GPS) receiver and the like.

The control unit 130, 140 can be arranged to store a pre-determined inverse tyre model $f^{-1}$ in memory, e.g., as a look-up table. The inverse tyre model is arranged to be stored in the memory as a function of the current operating condition of the wheel 210. This means that the behavior of the inverse tyre model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tyre model can be tailored for high load driving, where normal forces are large, another inverse tyre model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tyre model in dependence of a current operating condition of the wheel 210. It is appreciated that many aspects of the operating conditions can be approximated by default operating condition parameters, while other aspects of the operating conditions can be roughly classified into a smaller number of classes. Thus, obtaining the inverse tyre model in dependence of a current operating condition of the wheel 210 does not necessarily mean that a large number of different models need to be stored, or a complicated analytical function which is able to account for variation in operating condition with fine granularity.

Rather, it may be enough with two or three different models which are selected depending on operating condition. For instance, one model to be used when the vehicle is heavily loaded and another model to be used otherwise. In all cases, the mapping between tyre force and wheel slip changes in some way in dependence of the operating condition, which improves the precision of the mapping.

The inverse tyre model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Inverse tyre models can be automatically configured from the remote server 190, e.g., as software updates, or manually by a technician performing vehicle routine servicing.

Figure 4:
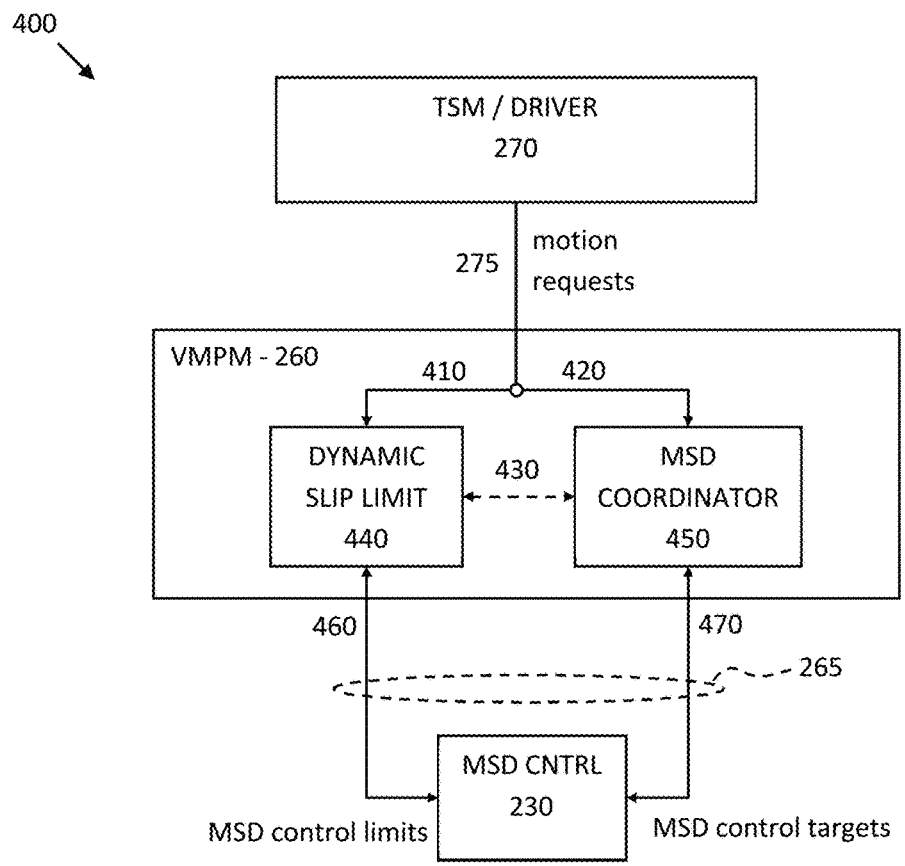
FIGS. 4-5 illustrate vehicle control function architectures.

FIG. 4 illustrates an example vehicle control function architecture, where a TSM layer 270 or a driver generates vehicle motion requests 275, which may comprise desired vehicle unit accelerations $a_{req}$ and vehicle curvatures $c_{req}$ or other types of vehicle motion requests, which together describe a desired motion by the vehicle along a desired path at a desired velocity profile. It is understood that the motion requests can be used as base for determining or predicting a required amount of longitudinal force which needs to be generated in order to successfully complete a maneuver. It is also understood that the motion requests can be used as base for determining or predicting a required amount of lateral force which needs to be generated in order to successfully complete a maneuver. The motion requests 275 are transmitted both as a vehicle motion request 410 to a dynamic slip limit configuration module 440 and as a corresponding vehicle motion request 420 to an MSD coordinator function 450.

The dynamic slip limit configuration module 440 determines suitable MSD control limits 460, such as sideslip angle limits, which are sent to the MSD control functions of the vehicle 100, where they are used to limit wheel behavior. The dynamic slip limit configuration module 440 optionally also configures a limit on longitudinal wheel slip. Generally, the slip limits are determined based on the request from the TSM layer 270 in a manner which guarantees that the motion request can be completed successfully. An important relationship in this context is the reduced ability to generate large longitudinal wheel forces at high slip angles. The dynamic slip limit configuration module 440 disclosed herein generates a dynamic limit, i.e., a time varying limit on sideslip angle, based on the motion requests from the TSM layer 270 and on the current state of the vehicle, such as its current velocity and yaw motion. The dynamic slip limit configuration module 440 configures limits on steering angle and/or on steering angle rate in order to maintain sideslip angle below the imposed sideslip angle limit. The interplay between steering angle limit and wheel slip limit can be used with advantage to improve vehicle maneuverability. For instance, a limit on steering angle may prompt the MSD coordinator function 450 to generate a yaw moment by other means, such as steer by braking. Essentially, this means that the dynamic wheel slip angle limit $\alpha_{lim}$ increases with a decreasing target acceleration $a_{req}$. Thus, if no substantial longitudinal wheel force needs to be generated, then a larger sideslip angle is allowed, and vice versa.

Another important relationship in this context is the reduced ability to generate lateral forces at high longitudinal wheel slip, as illustrated in FIG. 3. One way to ensure that sufficient lateral force can always be generated is, as mentioned above, to use a conservative longitudinal slip limit, i.e., a marge safety margin, say on the order of 0.05 in FIG. 3, but this would also limit the longitudinal force generation capability, which of course is undesired. According to the techniques disclosed herein. A dynamically configured longitudinal wheel slip limit can increase with a decreasing target curvature request, i.e., if no lateral forces are required for a given maneuver, then the slip limits can be increased in order to allow for more longitudinal force to be generated. For instance, suppose in a first scenario that the vehicle is driving on a straight road and suddenly needs to brake hard. Since there is no need to generate large lateral forces during the braking, a higher wheel slip limit can be used during the maneuver. On the other hand, a second scenario may involve cornering at relatively high speed, where significant lateral forces are required. Here, a lower longitudinal slip limit will be imposed by the dynamic slip limit configuration module 440 in order to make sure that sufficient lateral force can be generated such that the request from the TSM layer 270 can be fulfilled successfully.

The MSD coordinator function 450 performs MSD coordination in order to generate the global forces required to meet the motion requests from the TSM layer 270 or from the driver. This MSD coordination can be based on any force coordination routine. Advantageously, the force coordination can be performed under the assumption that, e.g., force vs slip relationships are approximately linear, and that lateral force can be generated independently of driving scenario and vehicle maneuver.

FIG. 4 also shows an optional safety signal interconnect 430 between the MSD coordinator function 450 and the dynamic slip limit configuration module 440. This connection can be used with advantage to exchange error messages and other status signals. For instance, in case the MSD coordinator function 450 fails or some reason, such as not being able to allocate forces successfully, or suffers from some other failure mode, then a message can be sent to the dynamic slip limit configuration module 440, which may then assume the role of MSD coordinator function in addition to slip limit configuration function. An example of vehicle motion control based on modified Hamiltonians is given in Gao, Yangyan, Mathias Lidberg, and Timothy Gordon. "Modified Hamiltonian algorithm for optimal lane change with application to collision avoidance." MM Science Journal (2015): 576-584. Further applications of Hamiltonian theory of vehicle motion control are described in Gao, Yangyan, and Timothy Gordon. "Optimal control of vehicle dynamics for the prevention of road departure on curved roads." IEEE Transactions on Vehicular Technology 68.10 (2019): 9370-9384, and Gao, Yangyan, Timothy Gordon, and Mathias Lidberg. "Optimal control of brakes and steering for autonomous collision avoidance using modified Hamiltonian algorithm." Vehicle system dynamics 57.8 (2019): 1224-1240.

Thus, according to some aspects the dynamic slip limit configuration module 440 is arranged as a redundant MSD coordinator. In case the primary MSD coordinator function 450 fails for some reason, the dynamic slip limit configuration module 440 steps in and assumes MSD control. This MSD control may optionally involve performing a safety maneuver, i.e., changing lanes and stopping at a safe location.

Figure 5:
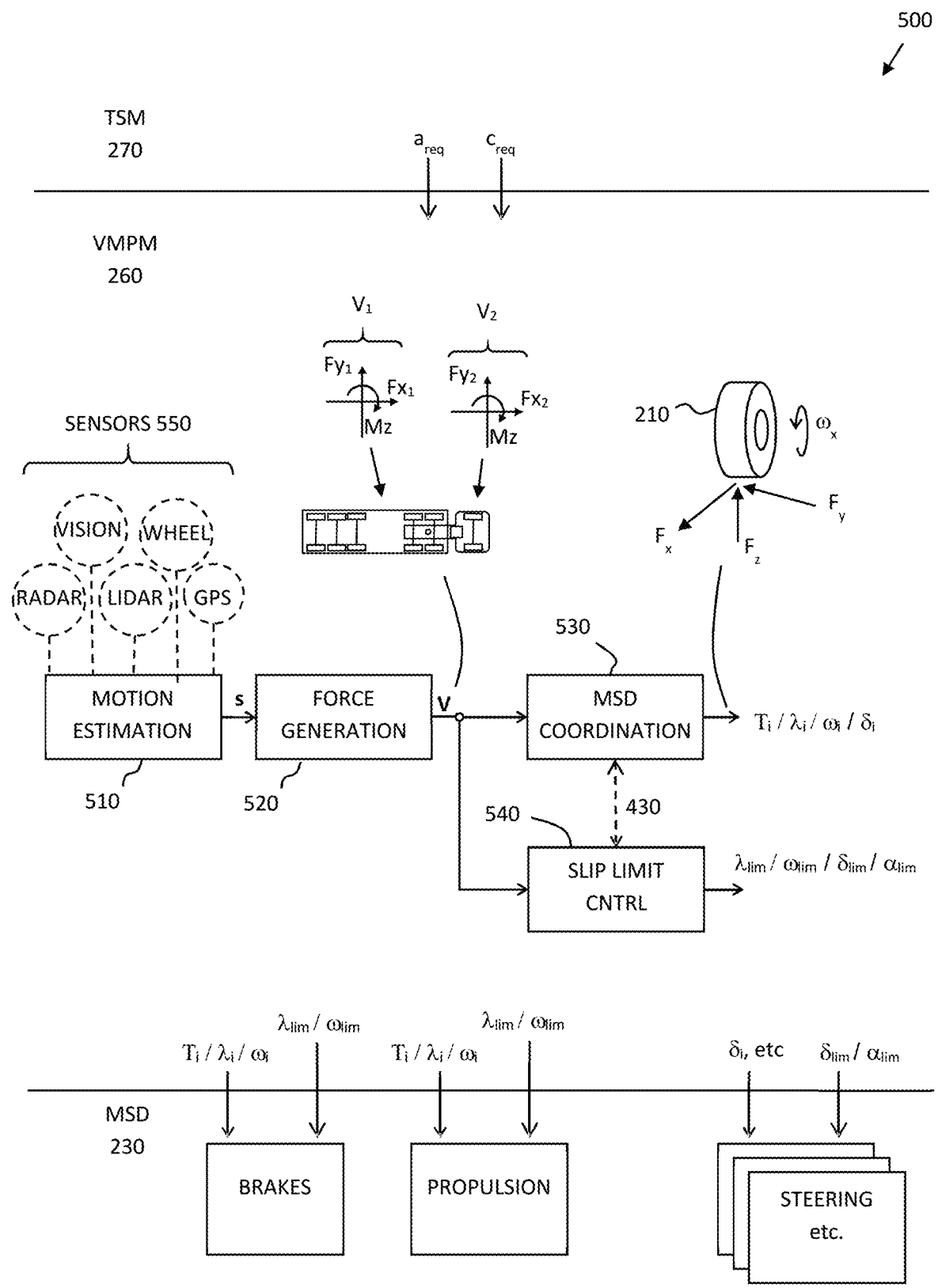

FIG. 5 illustrates an example control architecture suitable for controlling motion of a heavy-duty vehicle, such as the vehicle 100 discussed above in connection to FIG. 1. In this example, the dynamic slip limit configuration module 440 is implemented as a modified Hamiltonian algorithm which will be discussed in more detail below in connection to FIG. 8 and FIG. 9. Note the optional safety signal interconnect 430 which was discussed above.

The VMPM function 260 operates with a time horizon of about 1 second or so, and continuously transforms the acceleration profiles $a_{req}$ and curvature profiles $c_{req}$ from the TSM layer 270 into control commands for controlling vehicle motion functions, actuated by the different MSDs 220, 250 of the vehicle 100 which report back capabilities to the VMPM, which in turn are used as constraints in the vehicle control. The VMPM function 260 performs vehicle state or motion estimation 510, i.e., the VMPM function 260 continuously determines a vehicle state s comprising positions, speeds, accelerations, and articulation angles of the different units in the vehicle combination by monitoring operations using various sensors 550 arranged on the vehicle 100, often but not always in connection to the MSDs 220, 250.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$. The required global force vector V is input to an MSD coordination function 530 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\delta_i$. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors, steering angle sensors and/or lidar sensors, and translating this vehicle unit motion into a local coordinate system of a given wheel 210 (in terms of, e.g., longitudinal and lateral velocity components), it becomes possible to accurately estimate wheel slip in real time by comparing the vehicle unit motion in the wheel reference coordinate system to data obtained from the wheel speed sensor 240 arranged in connection to the wheel 210.

A tyre model, which was discussed above in connection to FIG. 3, can be used to translate between a desired longitudinal tyre force $Fx_i$ for a given wheel i and an equivalent longitudinal wheel slip $\lambda_i$ for the wheel. Longitudinal wheel slip relates to a difference between wheel rotational velocity and speed over ground and will be discussed in more detail below. Wheel speed $\omega$ is a rotational speed of the wheel, given in units of, e.g., rotations per minute (rpm) or angular velocity in terms radians/second (rad/sec) or degrees/second (deg/sec). Herein, a tyre model is a model of wheel behavior which describes wheel force generated in longitudinal direction (in the rolling direction) and/or lateral direction (orthogonal to the longitudinal direction) as function of wheel slip, as discussed above. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

To summarize, according to some aspects of the present disclosure, the VMPM function 260 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The interface 265 between VMPM and MSDs capable of delivering torque to the vehicle's wheels has, traditionally, been focused on torque-based requests to each MSD from the VMPM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Significant benefits can be achieved by instead using a wheel speed or wheel slip-based request on the interface 265 between VMPM and the MSD controller or controllers 230, thereby shifting the difficult actuator speed control loop to the MSD controllers, which generally operate with a much shorter sample time compared to that of the VMPM function. Such an architecture can provide much better disturbance rejection compared to a torque-based control interface and thus improves the predictability of the forces generated at the tyre road contact patch.

Figure 6:
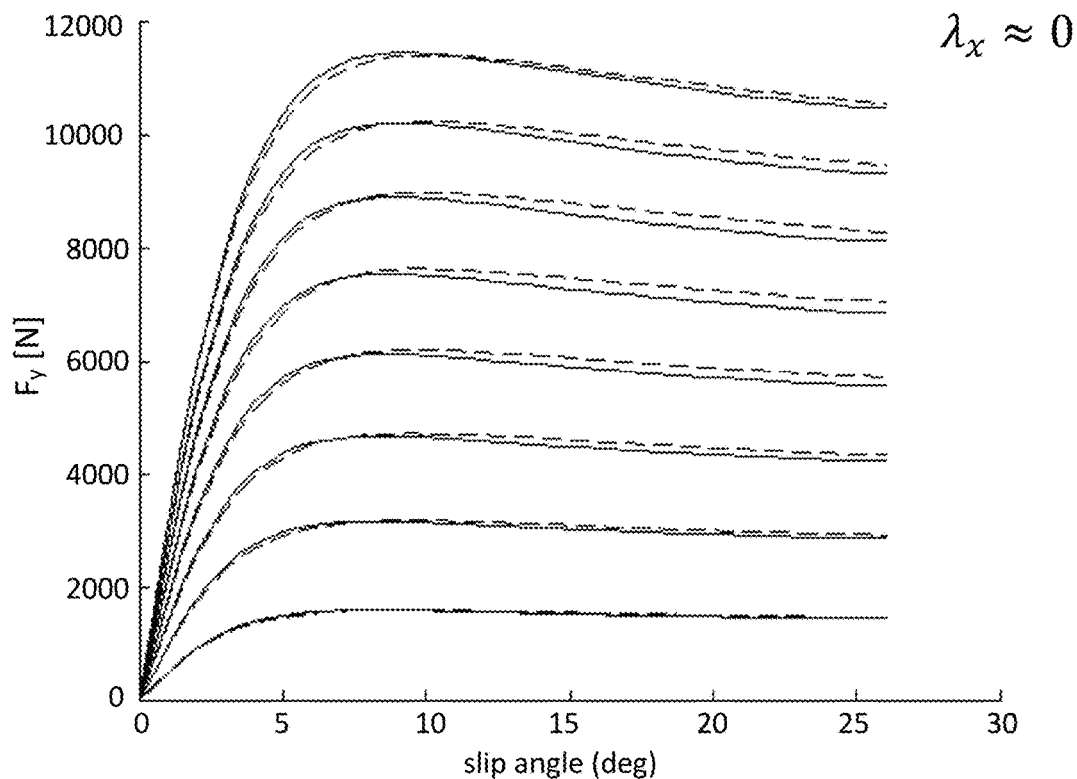
FIG. 6 is a graph showing wheel lateral force as function of slip angle.
Figure 7:
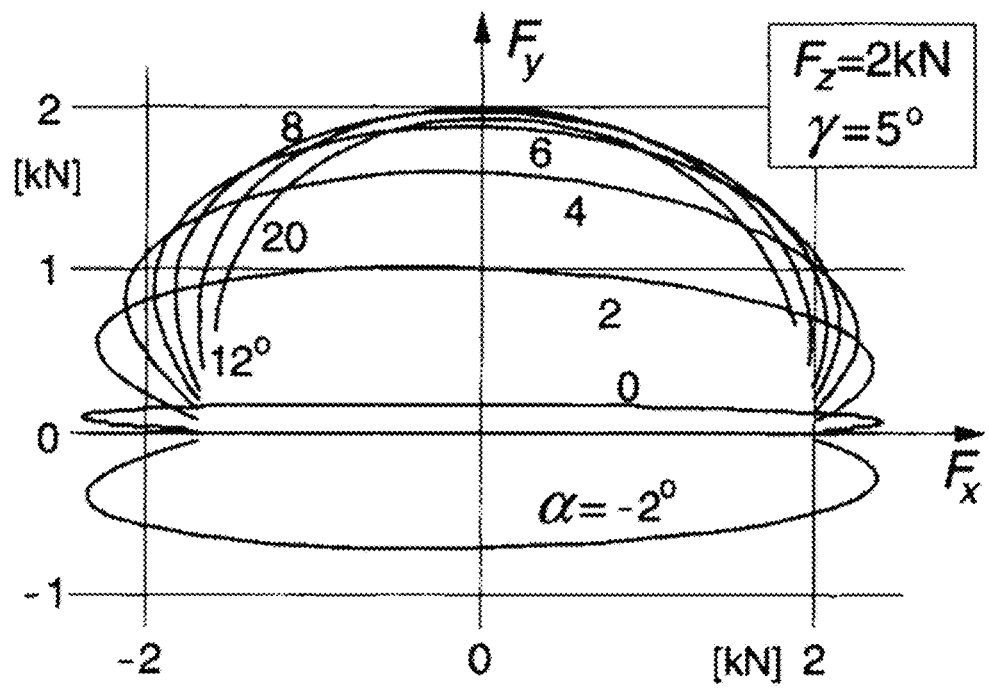
FIG. 7 schematically illustrates longitudinal and lateral tyre force interaction.

FIG. 6 is a graph showing wheel lateral force as function of slip angle. FIG. 6 shows typical pure lateral slip characteristics, in this case with zero longitudinal slip. A pure slip condition is herein defined as a situation when either longitudinal or lateral slip occurs in isolation. For the combined slip condition, which is demonstrated in FIG. 3, lateral force drops significantly with longitudinal slip. A more illustrative presentation of the combined slip condition, longitudinal and lateral tyre force interaction is shown in FIG. 7. Here, the example is given for normal tyre force $F_z$=2 kN and a camber angle γ of 5 degrees, where the same characteristic applies for all load and camber conditions. As shown in FIG. 7, when longitudinal and lateral tyre forces are bounded within the so called 'friction circle', the lateral tyre forces diminish with the increase of longitudinal forces, and vice versa.

The techniques disclosed herein comprises configuring a limit on sideslip angle (or, equivalently, on steered angle and/or on steering angle rate), based on the current vehicle state and desired motion, i.e., based on the motion request from the higher layer control functions discussed above. A vehicle model can be used to predict sideslip angles in response to a given control input. This model is then preferably of low complexity since it must be possible to execute in real-time during vehicle maneuvering.

Simulation models can be used to check ahead to get an idea of transient vehicle responses. The methods can comprise a combination of the two.

The vehicle model and the steering input tells the system what slip angles to expect at each tyre. A tyre demand monitor can be implemented which uses a combined non-linear slip model with longitudinal wheel slip, lateral wheel slip, vertical load, and road surface friction.

Figure 8:
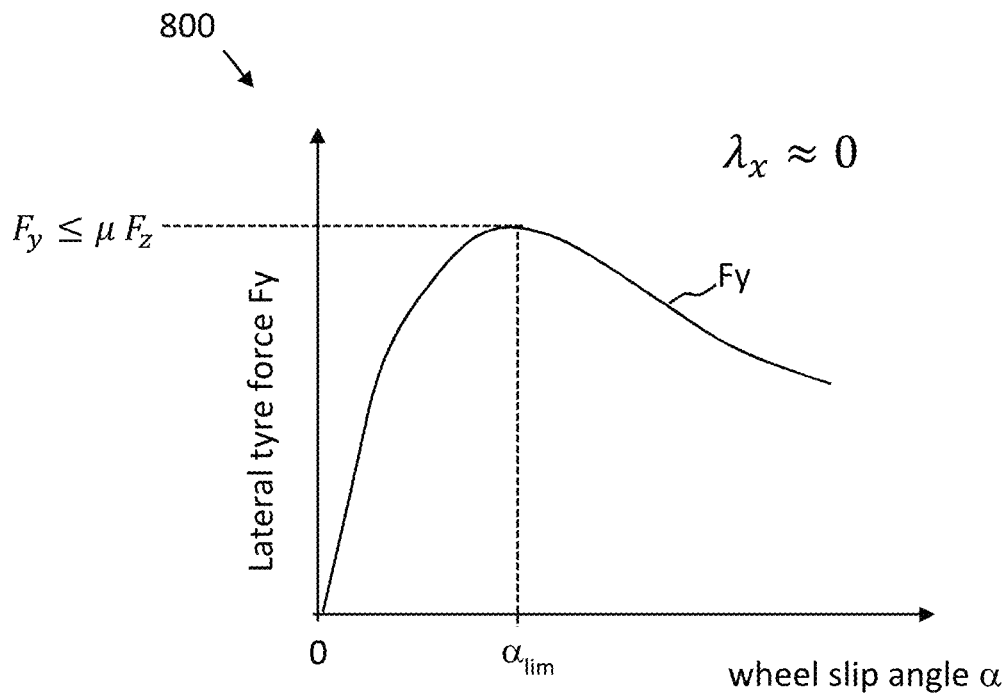
FIGS. 8-9 are graph showing example lateral tyre forces as function of wheel slip angle.

With reference to FIG. 8, for the case of zero longitudinal slip, $\lambda_x=0$, the problem is simple: a one-dimensional tyre curve 800 then shows the limit based on "more is worse"— i.e., the lateral force reduces when a slip angle increase causes the tire to exceed this adhesion peak. The limit $a_{lim}$ is then used as an upper limit, or the rate of steering is restricted as $a_{lim}$ is approached. Note that the limit is dependent on both the surface friction and vertical load, although values for both these parameters may be assumed as static pre-determined parameters or parameters which are configured dynamically.

Figure 9:
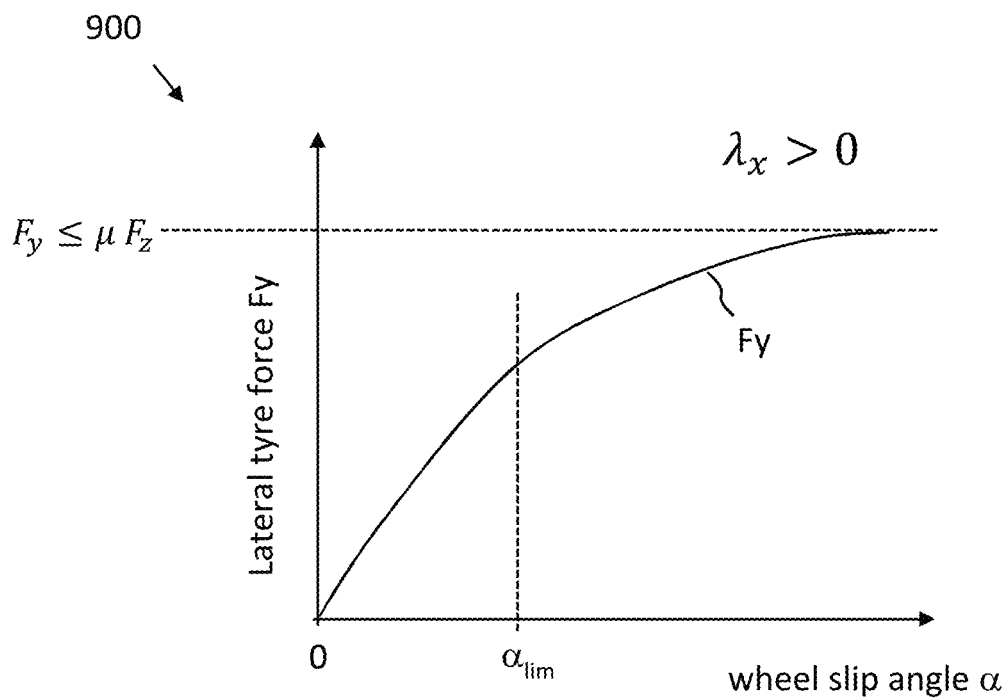
Figure 10:
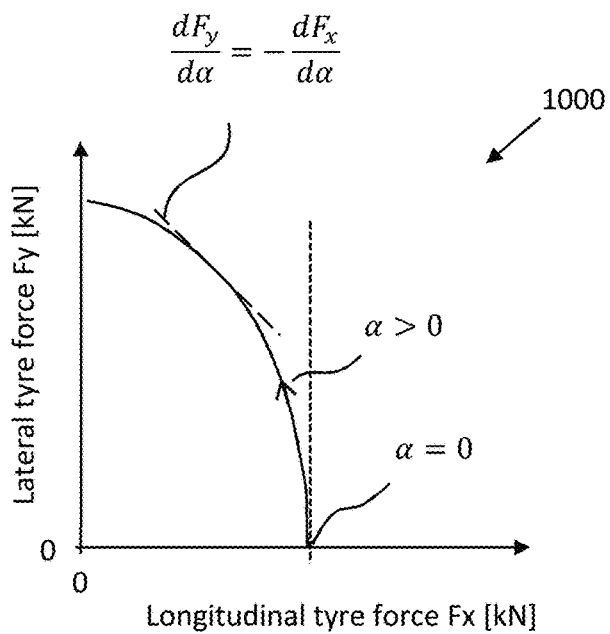
FIG. 10 illustrates lateral and longitudinal wheel force as function of wheel slip angle.

This kind of slip angle limit can be extended to the case where there is existing braking or driving, i.e., when a longitudinal wheel slip is present. FIG. 9 illustrates an example curve 900 where $\lambda_x>0$. In this case the curve continues to increase, i.e., more sideslip angle means more lateral force. However, this increase in generated lateral force is obtained at the expense of generated longitudinal force. Thus, a combined slip approach is needed, using the same principle: limit the slip angle whenever "more is worse". On any selected wheel it is possible to determine the amount by which the increase in Fy is offset by a reduction in Fx. FIG. 10 illustrates this tradeoff. For small values of a the slope of the curve 1000 is very steep, so it is worth allowing slip to increase. But for large a the slope becomes smaller and the increase in Fy is less than the reduction in Fx. So $\alpha_{lim}$ may be determined based on the gradient of the curve 1000, e.g., as the point where $$\frac{dF_y}{d\alpha} = -\frac{dF_x}{d\alpha}$$

This corresponds to a 45-degree angle on the tangent to the curve 1000. However, the point can of course also be selected as a tunable parameter. The limit on sideslip can be applied to all wheels of the vehicle and suppression of steering angle can be applied when any one wheel approaches the sideslip limit.

FIG. 10 represents a function of lateral wheel force capability and longitudinal wheel force capability as function of sideslip angle. Thus, it is understood that a dynamic wheel slip angle limit $\alpha_{lim}$ can be determined based on such a function of lateral wheel force capability and longitudinal wheel force capability. For instance, as exemplified in FIG. 10, the sideslip angle limit may be dynamically configured at a value at which an increase in lateral tyre force gives rise to a decrease in longitudinal force, which decrease is above an acceptable amount of decrease.

A low complexity steady-state vehicle model may often be sufficient to provide the steering limit data. Referring to FIG. 10, it is possible to, for instance, set slip limits and wheel force limits for all wheels at tyre coordinates. A look-up table can be used in the computations, in order to obtain a computationally efficient implementation.

Figure 11:
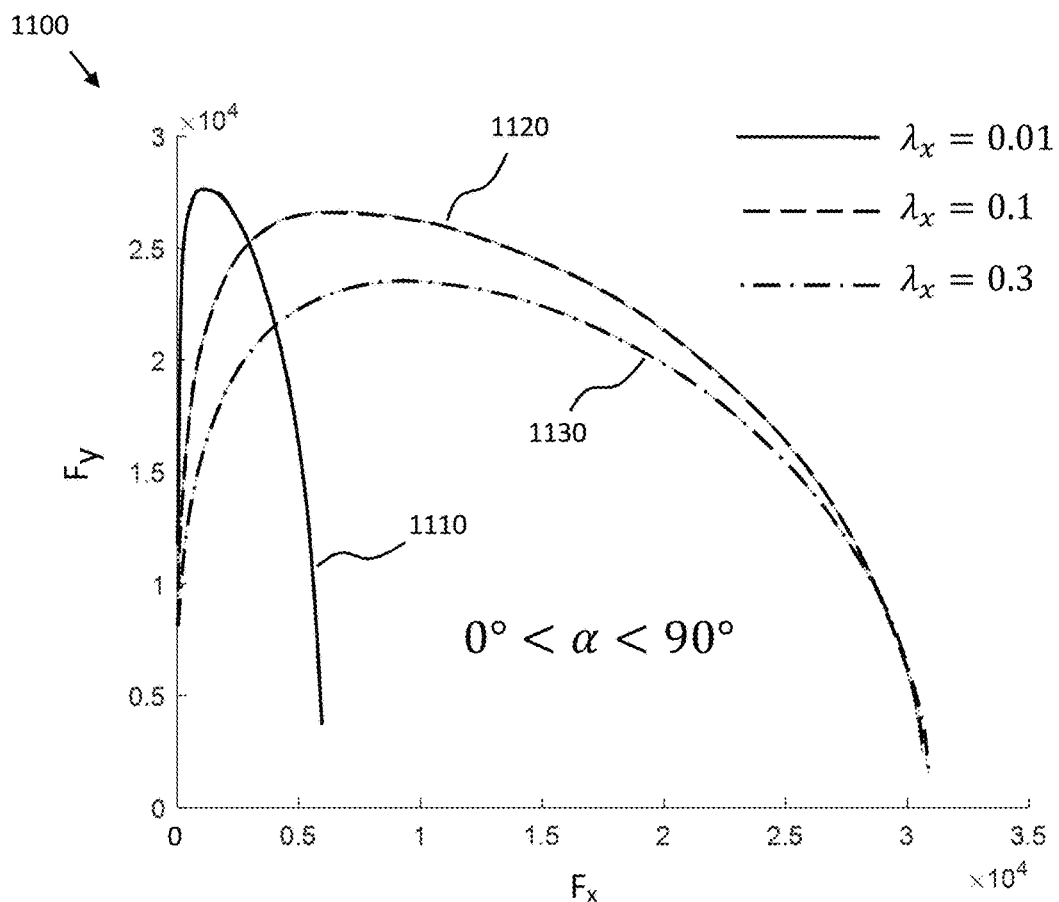
FIG. 11 is a graph which exemplifies wheel force for difference sideslip angles.

FIG. 11 shows some example relationships 1100 between longitudinal and lateral wheel force, as function of sideslip angle. Each curve 1110, 1120 and 1130 represents a fixed longitudinal wheel slip $\lambda_x$, where the sideslip angle has been swept from zero degrees to 90 degrees. It can be seen that when longitudinal wheel slip is very small, the limit on sideslip angle can be set relatively high, while the sideslip angle must be set lower for larger longitudinal wheel slips, in order to maintain the ability to generate longitudinal wheel force.

Figure 12:
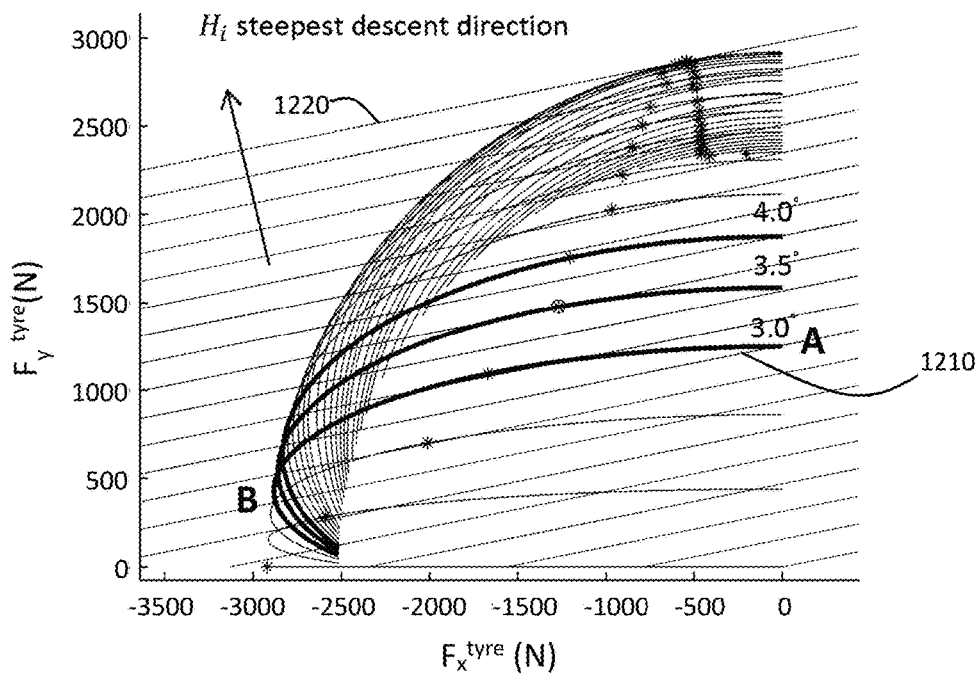
FIG. 12 is a graph showing wheel force for different slip angles.

FIG. 12 is a graph showing wheel force maps for different slip angles. Each solid curve 1210 represents the range of forces available due to changes in braking torque for a given slip angle, with terminal value corresponding to a locked wheel. For instance, the curve 1210 starts at A where almost no torque is applied. Higher and higher braking torque is then applied until a point B where maximum longitudinal force is being generated. After this point non-linear behavior causes the longitudinal force to decrease if even more braking torque is applied. The graph also shown curves corresponding to Hamiltonian values. The graph in FIG. 12 is explained in more detail in "Vehicle Motion and Stability Control at the Limits of Handling via the Modified Hamiltonian Algorithm: Methodology and Applications", doctoral thesis, Gao Yangyan, University of Lincoln, College of Science, School of Engineering, August 2018.

Figure 13:
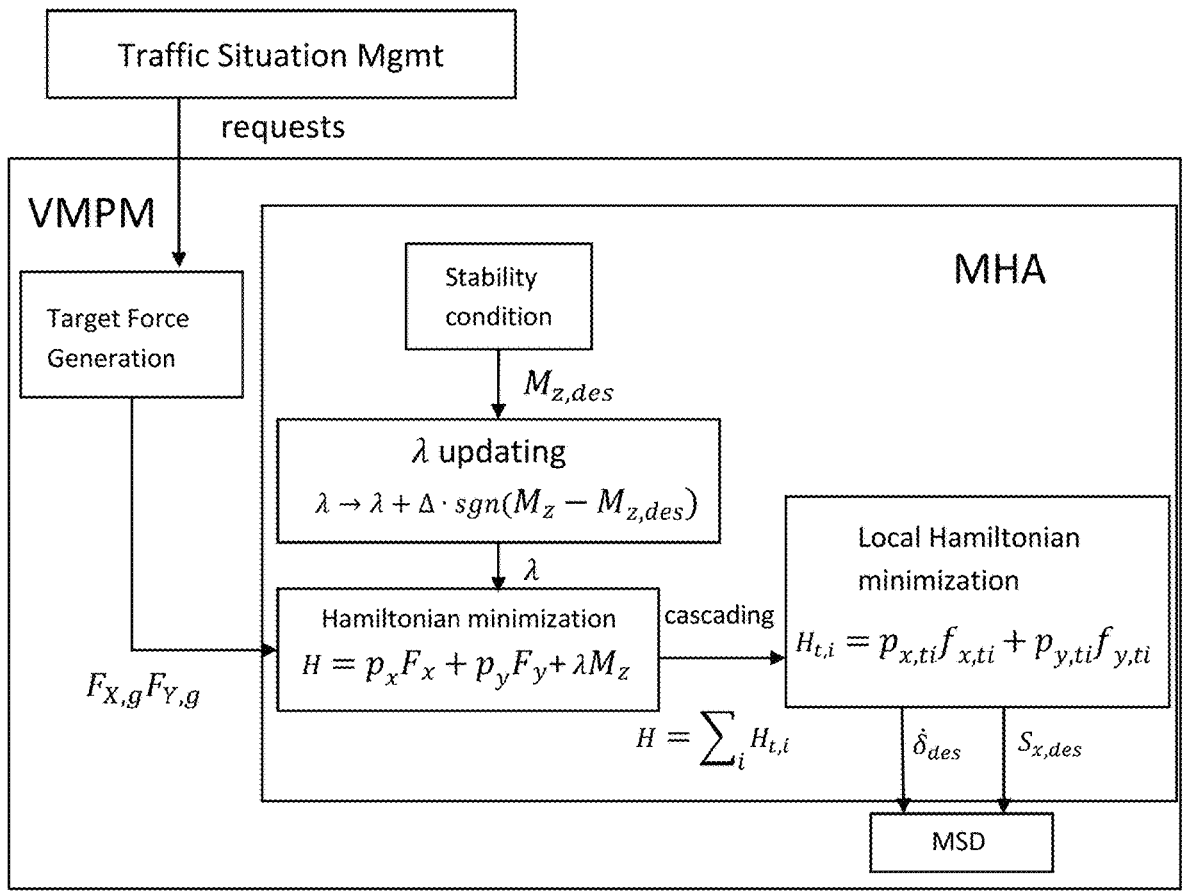
FIG. 13 shows an example of a Hamiltonian-based control method.

The dynamic configuration of slip limits, e.g., in the dynamic slip limit configuration module 440 shown in FIG. 4, can be implemented advantageously using a modified Hamiltonian (MHA) framework. FIG. 13 shows an example system diagram of how MHA may in determining slip limits. Consider the Hamiltonian function for a three degrees of freedom (3DOF) vehicle model and assume the vehicle operation condition is at the limits of friction, therefore only terminal cost function J is present. The Hamiltonian function is linear in virtual control inputs ($F_x$, $F_y$, $M_z$), $H=P_xF_x+P_yF_y+\lambda M_z$, where $P_xP_y\lambda$ are time-varying Lagrange multipliers or co-states of the dynamic system which reflect the gradient cost with respect to each state (here global forces and moment). According to Pontryagin's minimum principle, minimization of the scalar Hamiltonian function H at each time step is equivalent to minimizing the cost function J for the entire optimization duration. The states and co-states can be solved numerically off-line, which is often referred to as a two-point boundary value problem. However, it is often computationally too costly to be implemented in an on-board electronic control unit (ECU) to solve such optimization problems, especially when the degrees of freedom of the dynamic system becomes large. In the MHA method, the co-state values are instead estimated to meet a high-level reference (global longitudinal and lateral forces). Therefore $P_x,P_y$ should point in the opposite direction as Fx and Fy (to achieve a minimization of the Hamiltonian function). So $$p = [P_x, P_y] = -a^d/|a^d|$$

and $$a^d = \left[\frac{Fx}{M}, \frac{Fy}{M}\right]$$

where M is the vehicle total mass in kg, $a^d$ is the desired acceleration vector, Fx and Fy are the global forces references derived from the motion request of the TSM layer 270. In a vehicle motion control application, it is not only the global forces requirements which are important, but also the stability of the vehicle. Here the co-state $\lambda$ is associated with the yaw moment $M_z$, to be specific $\lambda$ is updated continuously to track a desired yaw moment $M_{z,d}$ to ensure the stability of the vehicle. The formulation of $M_{z,d}$ can vary somewhat depending on different stability requirements etc. It is often related to yaw rate error from the reference yaw rate and sideslip angle at the center of gravity location. Because the Hamiltonian function is a scalar function and linear with virtual controls, it can be rewritten from global coordinates (superscript g denotes values in a global coordinate system) to the vehicle coordinates (denoted instead by superscript v):

$$H = [p_x^g p_y^g]\begin{bmatrix} F_x^g \\ F_y^g \end{bmatrix} + \lambda M_z = [p_x^g p_y^g] R(\psi) \begin{bmatrix} F_x^v \\ F_y^v \end{bmatrix} + \lambda M_z = [p_x^v p_y^v]\begin{bmatrix} F_x^v \\ F_y^v \end{bmatrix} + \lambda M_z$$

where $[p_x^v p_y^v]$ represent co-states in vehicle coordinates:

$$[p_x^v p_y^v] = [p_x^g p_y^g] R(\psi)$$

Here, $\psi$ represents the yaw angle of the vehicle, and $R(\psi)$ is a rotational matrix for rotation by $\psi$. Note that both $[F_x^g F_y^g]$ and $[F_x^v F_y^v]$ are exerted on the center of gravity location. By expanding the Hamiltonian function H to include all the contribution forces from the tyres, one can write $$H = p_x^v \sum_i F_{x,i}^v + p_x^v \sum_i F_{y,i}^v + \lambda(x_i F_{y,i}^v - y_i F_{x,i}^v) =$$

$$\sum_i (p_x^v + \lambda x_i) F_{x,i}^v + (p_x^v - \lambda y_i) F_{y,i}^v = \sum_i H_i$$

Where $[\tilde{p}_{x,i}^v \tilde{p}_{y,i}^v] = [(p_x^v + \lambda y_i)(p_x^v - \lambda y_i)]$ is a co-state vector associated with each tyre, and the local Hamiltonian function (in vehicle coordinates) for each tyre can be written as:

$$H_i = \tilde{p}_{x,i}^v F_{x,i}^v + \tilde{p}_{y,i}^v F_{y,i}^v$$

Since the scalar product $H_i$ is the same in tyre and in vehicle coordinates, it is possible to rewrite $H_i$ in the tyre coordinate system (denoted by superscript t). Applying the rotational matrix $R(\delta_i)$ as $$H_i = [\tilde{p}_{x,i}^v \tilde{p}_{y,i}^v] R(\delta_i) \begin{bmatrix} F_{x,i}^t \\ F_{y,i}^t \end{bmatrix} = [\tilde{p}_{x,i}^t \tilde{p}_{y,i}^t] \begin{bmatrix} F_{x,i}^t \\ F_{y,i}^t \end{bmatrix}$$

where $$[\tilde{p}_{x,i}^t \tilde{p}_{y,i}^t] = [\tilde{p}_{x,i}^v \tilde{p}_{y,i}^v] R(\delta_i)$$

Now, minimizing the global Hamiltonian function (H) becomes equivalent to minimizing the local Hamiltonian function $(H_i)$.

FIG. 12 shows a practical example of how the Hamiltonian function $H_i$ is minimized over iterations in time. As noted above, the series of tyre curves represent the range of tyre forces available due to changes in braking torque for a range of tyre sideslip angles. At each computational time instant, i.e., at each iteration, the local co-states $[\tilde{p}_{x,t}^t \tilde{p}_{y,t}^t]$ are estimated according to the formula, which determines the slop of the Hamiltonian function, represented by the series of straight lines 1220. The $H_i$ steepest descent direction is perpendicular to the constant $H_i$ lines. Given the current slip angle of the tyre (3.5 degrees for example), the minimum $H_i$ is reached at the circle marker, which corresponds to a braking force around −1250 N and the longitudinal slip ratio (determined by the aforementioned tyre model). In the actual implementation, a range of slip ratios [−0.2:0.001:0] is swept through as the optimal control variable to the combined slip tyre model, together with other inputs such as slip angle $\alpha$, tyre normal load $F_z$ (both can be estimated on fly), to calculate the constant $H_i$. To find the minimum $H_i$ a linear one-dimensional search is performed. This process is repeated each iteration, typically around 10 ms, for each of the wheels on the vehicle 100. The optimal longitudinal slips determined in this manner provides the dynamic slip limits which constitute the output of the control allocator 450.

A further reduction in $H_i$ can be achieved through changing slip angle $\alpha$. In the example in FIG. 12, further $H_i$ minimization can be achieved by increasing slip angle $\alpha$. A small perturbation $\varepsilon$ can be introduced around the 'star' point, i.e., the optimum value for the current sideslip, $$\frac{\partial H_i}{\partial \alpha_i} \approx \frac{H_i(\alpha_i + \varepsilon) - H_i(\alpha_i - \varepsilon)}{2\varepsilon}$$

When the vehicle sideslip angle $\beta$ is small we have $$\alpha_i \approx \delta_i + \beta - \frac{\dot{\psi}}{v_x} x_i$$

where $\dot{\psi}$ is vehicle yaw rate, $v_x$ is longitudinal vehicle velocity and $x_i$ is longitudinal distance between the vehicle unit center of gravity and the position of the wheel center.

In the following example, it is assumed the vehicle configuration is only front axle steer. Other steering combination may apply similar logic. Hamiltonian function minimization through steering can be expressed as $$H_\delta \equiv \frac{\partial H}{\partial \delta} = \frac{\partial H_1}{\partial \alpha_1} \cdot \frac{\partial \alpha_1}{\partial \delta} + \frac{\partial H_2}{\partial \alpha_2} \cdot \frac{\partial \alpha_2}{\partial \delta} = \frac{\partial H_1}{\partial \alpha_1} + \frac{\partial H_2}{\partial \alpha_2}$$

Thus, if the current steering wheel angle provides $H_\delta = 0$, then the current steering wheel angle is optimal, since it minimizes the Hamiltonian function: If $|H_\delta| > 0$, then the Hamiltonian function is not at its minimum value, which in turn means that one or more axles should be steered in the opposite direction of $H_\delta$, in order to further reduce Hamiltonian H value. Assuming an effective rate limit $k_\delta$ for the front axle steering actuator, we locally reduce the value of H via the control law:

$$\dot{\delta} = \begin{cases} -k_\delta \text{sgn}(H_\delta) & |H_\delta| > T \\ 0 & \text{else} \end{cases}$$

I.e., the idea is to steer the vehicle in the opposite direction of $H_\delta$ to further reduce H value. However, a threshold T is introduced here to avoid chattering behavior, which may occur when $H_\delta$ is small. Such steering rate can be directly used as a dynamic rate limiter to limit the steering angle output from, e.g., a B-matrix type of control allocator. Or alternatively, to find the steering angle limit, simple using:

$$\delta_{lim} = \delta_{current} + \dot{\delta} \cdot \Delta t$$

Where $\Delta t$ is controller time step or inverse update frequency.

A B-matrix control allocation method can be any method which uses a linear model to map control input u to some form of control effect. A common formulation of a control allocation application is $$\dot{x} = Ax + Bu + d$$

where $\dot{x}$ is a time derivative of the state x, u is a control input, and d is some form of distortion. A and B are matrixes which define the model. Other formulations are of course also possible.

Figure 14:
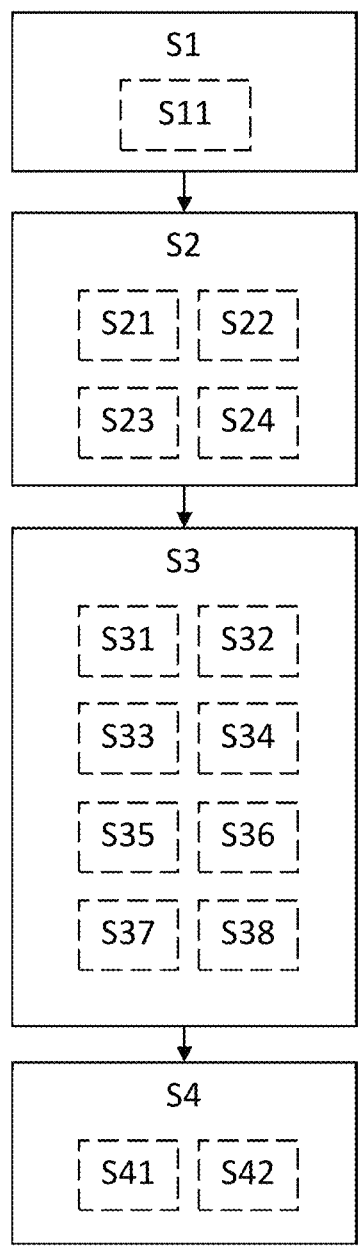
FIG. 14 is a flow chart illustrating methods.

FIG. 14 is a flow chart illustrating methods which summarize at least some of the discussions above. There is illustrated a computer-implemented method performed in a vehicle control unit 130, 140 for controlling motion of a heavy-duty vehicle 100. The method comprises obtaining S1 a vehicle motion request, wherein the vehicle motion request is indicative of a target curvature $c_{req}$ and a target acceleration $a_{req}$, $c_{req}$. This motion request may, e.g., be obtained S11 from a driver input and/or from an autonomous or semi-autonomous TSM function 270, as discussed above in connection to FIGS. 2, 4, and 5.

The method also comprises determining S2 an MSD control allocation $T_i/\lambda_i/\omega_i/\delta_i$ based on the vehicle motion request. This MSD control allocation was discussed above in connection to FIG. 2 and FIG. 5 and may be determined as a force allocation which generates a vehicle motion in accordance with the motion request from the higher layer control function. According to aspects, the method comprises determining S21 the MSD control allocation for the i:th wheel $T_i/\lambda_i/\omega_i/\delta_i$ (torque $T_i$, longitudinal wheel slip $\lambda_i$, wheel rotational speed $\omega_i$, and/or wheel steering angle $\delta_i$) based on a B-matrix control allocation method based on an optimization evolving the vehicle motion request and a motion model of the vehicle. B-matrix control allocation methods are generally known and will therefore not be discussed in more detail herein. The MSD control may at least partly be determined S22 as a target wheel torque $T_i$. MSDs such as friction brakes and various propulsion devices may be controlled based on a target torque. This target torque is submitted to the respective MSD controller as a torque request, whereupon the MSD controller controls the MSD to generate an actual torque corresponding to the torque request. According to other aspects, the method comprises determining S23 the MSD control allocation at least partly as a target longitudinal wheel slip $\lambda_i$ or wheel speed relative to ground $\omega_i$. This type of control is associated with some advantages. For instance, a controlled vehicle start may be achieved in an efficient manner, since control is based directly on wheel slip, or wheel speed difference with respect to the velocity of the vehicle, as opposed to more traditional forms of torque-based control. Control is then shifted more towards the propulsion unit or units and away from central vehicle control, which is an advantage since control loops of higher bandwidth (faster loops) can be realized in this manner. Unforeseen resistances and transients can be better handled due to the increased control bandwidth locally compared to centrally. The MSD control allocation may also comprise determining S24 the MSD control allocation at least partly as a target steering angle $\delta_i$. This target steering angle will generate lateral force in accordance with the obtained vehicle motion request. It is noted that the target steering angle may be advantageously controlled in dependence of the predicted sideslip. Sideslip can in some cases have a profound effect on the possibility of generating wheel force, as was discussed above in connection to FIG. 6 and FIG. 8. In some scenarios, it may be beneficial to reduce the steering angle and instead steer by braking, i.e., apply a different torque on the two sides of a vehicle unit in order to generate a yaw moment.

The method also comprises determining S3 a dynamic wheel slip angle limit $\alpha_{lim}$ based on the vehicle motion request, where the dynamic wheel slip angle limit $\alpha_{lim}$ increases with a decreasing target acceleration $a_{req}$. This part of the method is key to obtaining the main advantages discussed above. By configuring the sideslip limits dynamically, smaller margins can be used, at least as long as no significant longitudinal wheel forces are required. The techniques disclosed herein provide examples of methods which are able to determine suitable slip limits that allow generation of the required wheel forces, and which are not unnecessarily limiting the ability to, e.g., generate longitudinal wheel force. The methods therefore increase the maneuverability of a heavy-duty vehicle, such as the vehicle 100 discussed above in connection to FIG. 1. Consequently, controlling S4 the motion of the heavy-duty vehicle 100 based on the MSD control allocation constrained by the dynamic longitudinal wheel slip limit implies an improved performance by the vehicle 100. Optionally, the method comprises determining S33 a dynamic steering angle limit $\delta_{lim}$ based on the dynamic wheel slip angle limit $\alpha_{lim}$ and on a vehicle state and/or determining S34 a dynamic steering angle rate limit $\dot{\delta}_{lim}$ based on the dynamic wheel slip angle limit $\alpha_{lim}$ and on the vehicle state.

According to some aspects, the method comprises predicting a longitudinal wheel slip resulting from the vehicle motion request and determining S31 the dynamic wheel slip angle limit $\alpha_{lim}$ based on the predicted longitudinal wheel slip. These mechanisms were discussed above in connection to FIGS. 6-11.

The method may also comprise predicting a required longitudinal force $F_x$ to be generated based on the vehicle motion request and determining S32 the dynamic wheel slip angle limit $\alpha_{lim}$ based on the predicted required longitudinal force $F_x$.

The methods may also comprise determining the dynamic longitudinal wheel slip limit $\lambda_{lim}/\omega_{lim}$ by executing S35 a modified Hamiltonian algorithm (MHA), where the MHA optionally comprises minimizing S36 local Hamiltonian functions at one or more wheels, where each minimization comprises a linear search of a tyre force curve. This approach to determining wheel slip limits were discussed in detail above in connection to FIG. 12. As part of this approach, the methods may also comprise determining S38 the dynamic longitudinal wheel slip limit $\lambda_{lim}/\omega_{lim}$ based on a stability condition involving a maximum acceptable yaw moment $M_z$ of the vehicle 100.

The method may also comprise determining S37 the dynamic wheel slip angle limit $\alpha_{lim}$ as a function of lateral wheel force capability and longitudinal wheel force capability. An example of this was discussed above in connection to FIG. 10. For instance, the function can be based on a pre-determined limit on predicted reduction in generated longitudinal force corresponding to an increase in generated lateral force.

The method optionally comprises triggering a torque overlay S41 on a vehicle steering wheel in case a current steering wheel angle generates a sideslip angle in excess of the dynamic wheel slip angle limit $\alpha_{lim}$ and/or triggering a warning signal S42 to notify a driver of the vehicle 100 in case a current steering wheel angle generates a sideslip angle in excess of the dynamic wheel slip angle limit $\alpha_{lim}$. Of course, the sideslip angle limits are advantageously transmitted throughout the overall vehicle control system, where the limits may be used for vehicle control, e.g., by the VMPM module.

Figure 15:
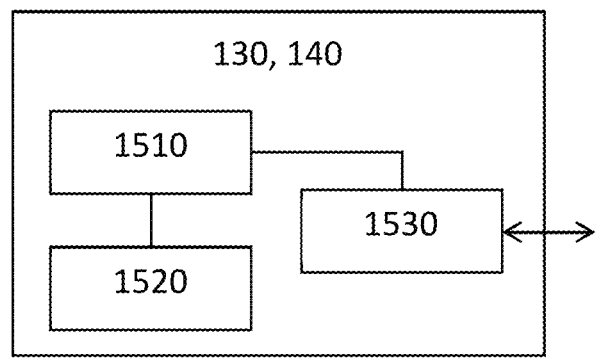
FIG. 15 schematically illustrates a control unit.

FIG. 15 schematically illustrates, in terms of a number of functional units, the components of a control unit such as the VCU 130, 140. The control unit may implement one or more of the above discussed functions of the TSM 270, VMPM 260 and/or the MSD control function 230, according to embodiments of the discussions herein. The control unit is configured to execute at least some of the functions discussed above for control of a heavy-duty vehicle 100. Processing circuitry 1510 is provided using any combination of one or more of a suitable central processing unit CPU, multiprocessor, microcontroller, digital signal processor DSP, etc., capable of executing software instructions stored in a computer program product, e.g., in the form of a storage medium 1520. The processing circuitry 1510 may further be provided as at least one application specific integrated circuit ASIC, or field programmable gate array FPGA.

Particularly, the processing circuitry 1510 is configured to cause the control unit 101 to perform a set of operations, or steps, such as the methods discussed in connection to FIG. 14. For example, the storage medium 1520 may store the set of operations, and the processing circuitry 1510 may be configured to retrieve the set of operations from the storage medium 1520 to cause the control unit 130, 140 to perform the set of operations. The set of operations may be provided as a set of executable instructions. Thus, the processing circuitry 1510 is thereby arranged to execute methods as herein disclosed.

The storage medium 1520 may also comprise persistent storage, which, for example, can be any single one or combination of magnetic memory, optical memory, solid state memory or even remotely mounted memory.

The control unit 130, 140 may further comprise an interface 1530 for communications with at least one external device. As such the interface 1530 may comprise one or more transmitters and receivers, comprising analogue and digital components and a suitable number of ports for wireline or wireless communication.

The processing circuitry 1510 controls the general operation of the control unit 130, 140, e.g., by sending data and control signals to the interface 1530 and the storage medium 1520, by receiving data and reports from the interface 1530, and by retrieving data and instructions from the storage medium 1520. Other components, as well as the related functionality, of the control node are omitted in order not to obscure the concepts presented herein.

Figure 16:
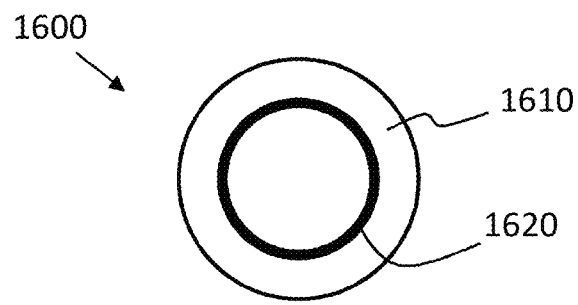
FIG. 16 shows an example computer program product.

FIG. 16 illustrates a computer readable medium 1610 carrying a computer program comprising program code means 1620 for performing the methods illustrated in FIG. 14, when said program product is run on a computer. The computer readable medium and the code means may together form a computer program product 1600.

The invention claimed is:

1. A computer-implemented method performed in a vehicle control unit for controlling motion of a heavy-duty vehicle, the method comprising obtaining a vehicle motion request, wherein the vehicle motion request is indicative of a target curvature and a target acceleration, determining a motion support device, MSD, control allocation based on the vehicle motion request, determining a dynamic wheel slip angle limit for at least one wheel of the vehicle based on the vehicle motion request, where the dynamic wheel slip angle limit increases with a decreasing target acceleration and corresponds to a value at which an increase in lateral tire force gives rise to more than a specified amount of decrease in longitudinal force, and controlling the motion of the heavy-duty vehicle based on the MSD control allocation constrained by the dynamic wheel slip angle limit.

2. The method according to claim 1, comprising obtaining the vehicle motion request from a driver input and/or from an autonomous or semi-autonomous traffic situation management, TSM, function.

3. The method according to claim 1, comprising determining the MSD control allocation based on a B-matrix control allocation method.

4. The method according to claim 1, comprising determining the MSD control allocation at least partly as a target wheel torque.

5. The method according to claim 1, comprising determining the MSD control allocation at least partly as a target longitudinal wheel slip or wheel speed relative to ground.

6. The method according to claim 1, comprising determining the MSD control allocation at least partly as a target steering angle.

7. The method according to claim 1, comprising predicting a longitudinal wheel slip resulting from the vehicle motion request, and determining the dynamic wheel slip angle limit based on the predicted longitudinal wheel slip.

8. The method according to claim 1, comprising predicting a required longitudinal force to be generated based on the vehicle motion request, and determining the dynamic wheel slip angle limit based on the predicted required longitudinal force.

9. The method according to claim 1, comprising determining a dynamic steering angle limit based on the dynamic wheel slip angle limit and on a vehicle state.

10. The method according to claim 1, comprising determining a dynamic steering angle rate limit based on the dynamic wheel slip angle limit and on a vehicle state.

11. The method according to claim 1, comprising determining the dynamic wheel slip angle limit by executing a modified Hamiltonian algorithm, MHA.

12. The method according to claim 11, wherein the MHA comprises minimizing local Hamiltonian functions at one or more wheels, where each minimization comprises a linear search of a tire force curve.

13. The method according to claim 1, comprising determining the dynamic wheel slip angle limit as a function of lateral wheel force capability and longitudinal wheel force capability.

14. The method according to claim 13, where the function is based on a pre-determined limit on predicted reduction in generated longitudinal force corresponding to an increase in generated lateral force.

15. The method according to claim 1, comprising determining a dynamic longitudinal wheel slip limit based on a stability condition involving a maximum acceptable yaw moment of the vehicle.

16. The method according to claim 1, comprising triggering a torque overlay on a vehicle steering wheel in case a current steering wheel angle generates a sideslip angle in excess of the dynamic wheel slip angle limit.

17. The method according to claim 1, comprising triggering a warning signal to notify a driver of the vehicle in case a current steering wheel angle generates a sideslip angle in excess of the dynamic wheel slip angle limit.

18. A non-transitory computer program comprising program code that, when executed by a computer or on processing circuitry of a control unit, cause the computer or processing circuitry to perform operations comprising: obtaining a vehicle motion request, wherein the vehicle motion request is indicative of a target curvature and a target acceleration, determining a motion support device, MSD, control allocation based on the vehicle motion request, determining a dynamic wheel slip angle limit for at least one wheel of the vehicle based on the vehicle motion request, where the dynamic wheel slip angle limit increases with a decreasing target acceleration and corresponds to a value at which an increase in lateral tire force gives rise to more than a specified amount of decrease in longitudinal force, and controlling the motion of a heavy-duty vehicle based on the MSD control allocation constrained by the dynamic wheel slip angle limit.

19. A non-transitory computer readable medium carrying a computer program comprising program code that, when executed by a computer or on processing circuitry of a control unit, cause the computer or processing circuitry to perform operations comprising: obtaining a vehicle motion request, wherein the vehicle motion request is indicative of a target curvature and a target acceleration, determining a motion support device, MSD, control allocation based on the vehicle motion request, determining a dynamic wheel slip angle limit for at least one wheel of the vehicle based on the vehicle motion request, where the dynamic wheel slip angle limit increases with a decreasing target acceleration and corresponds to a value at which an increase in lateral tire force gives rise to more than a specified amount of decrease in longitudinal force, and controlling the motion of a heavy-duty vehicle based on the MSD control allocation constrained by the dynamic wheel slip angle limit.

20. A control unit, comprising: processing circuitry; an interface coupled to the processing circuitry; and a memory coupled to the processing circuitry, wherein the memory comprises machine readable computer program instructions that, when executed by the processing circuitry, causes the control unit to perform operations of: obtaining a vehicle motion request, wherein the vehicle motion request is indicative of a target curvature and a target acceleration, determining a motion support device, MSD, control allocation based on the vehicle motion request, determining a dynamic wheel slip angle limit based on the vehicle motion request, where dynamic wheel slip angle limit increases with a decreasing target acceleration and corresponds to a value at which an increase in lateral tire force gives rise to more than a specified amount of decrease in longitudinal force, and controlling the motion of a heavy-duty vehicle based on the MSD control allocation constrained by the dynamic wheel slip angle limit.

21. The heavy-duty vehicle comprising a control unit according to claim 20.

* * * * *